United States Patent
Lyons et al.

(10) Patent No.: US 9,481,136 B2
(45) Date of Patent: Nov. 1, 2016

(54) OVER-MOLDED VACUUM BARRIER AND INNER MOLD LINE BAG CARRIER WITH SOLUBLE DETAILS IN TRAPPED CLOSED MOLD TOOLING

(71) Applicant: The Boeing Company, Seal Beach, CA (US)

(72) Inventors: Brett I. Lyons, Chicago, IL (US); Robert G. Albers, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1090 days.

(21) Appl. No.: 13/665,698

(22) Filed: Oct. 31, 2012

(65) Prior Publication Data

US 2015/0137430 A1    May 21, 2015

(51) Int. Cl.
| | |
|---|---|
| *B29C 33/38* | (2006.01) |
| *B29C 70/44* | (2006.01) |
| *B29C 70/34* | (2006.01) |
| *B29C 33/50* | (2006.01) |
| *B29C 33/52* | (2006.01) |
| *B29K 105/06* | (2006.01) |

(52) U.S. Cl.
CPC ........... *B29C 70/446* (2013.01); *B29C 33/505* (2013.01); *B29C 33/52* (2013.01); *B29C 70/342* (2013.01); *B29C 70/443* (2013.01); *B29K 2105/06* (2013.01); *B29K 2995/0059* (2013.01)

(58) Field of Classification Search
CPC .... B29C 70/446; B29C 33/505; B29C 70/34
See application file for complete search history.

(56) References Cited

U.S. PATENT DOCUMENTS

| | | | |
|---|---|---|---|
| 4,389,367 A | 6/1983 | Hudson | |
| 4,693,678 A | 9/1987 | Von Volkli | |
| 5,795,524 A * | 8/1998 | Basso, Jr. | B29C 33/52 156/155 |
| 6,264,868 B1 | 7/2001 | Marchant | |
| 6,340,509 B1 * | 1/2002 | Nelson | B29C 33/40 156/156 |
| 6,828,373 B2 | 12/2004 | Artz et al. | |
| 2003/0162606 A1* | 8/2003 | Schikner | A63B 53/02 473/319 |
| 2008/0105997 A1* | 5/2008 | Ridges | B29C 33/448 264/226 |
| 2009/0014919 A1 | 1/2009 | Rossfeldt | |
| 2010/0000667 A1 | 1/2010 | Funnell | |
| 2010/0139857 A1 | 6/2010 | Pham et al. | |
| 2010/0237531 A1 | 9/2010 | Lyons | |

FOREIGN PATENT DOCUMENTS

| | | |
|---|---|---|
| EP | 1310351 | 5/2003 |
| EP | 1800825 | 6/2007 |
| EP | 2145751 | 1/2010 |
| GB | 2040790 | 9/1980 |
| WO | WO9854046 | 12/1998 |
| WO | WO2009083531 | 7/2009 |

OTHER PUBLICATIONS

PCT/US2013/063643 International Search Report dated Mar. 3, 2014.

* cited by examiner

*Primary Examiner* — Galen Hauth (57) ABSTRACT

A vacuum barrier system for curing a composite part may include a bag carrier and a compliant, relatively thin film bladder formed over the bag carrier to function as a vacuum barrier. The bag carrier may be configured complementary to the composite part. The bladder may seal the bag carrier therewithin.

17 Claims, 10 Drawing Sheets

OVER-MOLDED VACUUM BARRIER AND INNER MOLD LINE BAG CARRIER WITH SOLUBLE DETAILS IN TRAPPED CLOSED MOLD TOOLING

FIELD

The present disclosure relates generally to composites manufacturing and, more particularly, to a vacuum barrier system for processing composite parts in closed-mold tooling.

BACKGROUND

Composite structures are used in a wide variety of applications. In aircraft construction, composites are used in increasing quantities to form the fuselage, wings, and other components of the aircraft. The wings of an aircraft are generally hollow structures that may require a smooth and dimensionally-accurate outer mold line (OML) surface. The wings may be constructed of composite skin members and may include internal components such as ribs, spars, and/or stiffeners to increase the strength and bending stiffness of the wings.

In conventional construction techniques for forming three-dimensional composite structures such as an aircraft wing, cured composite components such as wing spars may be assembled to composite skin members by mechanical fastening. The process of assembling the composite components may require the use of a large quantity of mechanical fasteners and specialized tooling for maintaining the relative positions of the composite components during assembly. Unfortunately, the process of forming the cured composite components in a separate step and then later assembling such components using mechanical fasteners is a time-consuming and labor-intensive process. In addition, the mechanical fasteners may increase the overall weight of the composite structure. Furthermore, mechanical fasteners that are installed in OML surfaces may disrupt the aerodynamics of the composite structure.

Conventional processes for forming hollow composite structures also include the use of internal tooling. For composite structures having non-draftable geometry, the internal tooling must be removable from the interior of the composite part after curing. An inflatable mandrel may be installed within a hollow composite layup that may be positioned within a closed female mold. The inflatable mandrel may be inflated to apply an internal compaction pressure on the composite layup against the female mold to consolidate the composite layup. Heat may be applied to cure the composite layup. After curing of the composite layup, the mandrel may be deflated and removed from the cured composite structure. Unfortunately, an inflatable mandrel is generally limited in the ability to form the part surface geometry to a high level of accuracy. In addition, inflatable mandrels may be limited in their use with composite materials having high processing temperatures.

As can be seen, there exists a need in the art for a system and method for forming hollow, non-draftable, composite structures to a high level of accuracy and without the need for assembling composite parts using mechanical fasteners. Ideally, the composite forming system and method is relatively simple and includes reusable tooling that is durable to provide a relatively long useful life.

SUMMARY

The above-noted needs associated with composite forming systems for hollow composite parts are specifically addressed and alleviated by the present disclosure which provides a vacuum barrier system having a bag carrier and a vacuum barrier film or bladder that may be molded or formed over the bag carrier. The bag carrier may be configured complementary to the composite part. The vacuum barrier film or bladder may be molded over the bag carrier for sealing the bag carrier.

Also disclosed is a method of fabricating a vacuum barrier system. The method may include fabricating a soluble forming mandrel, and laying up composite material over the soluble forming mandrel. The method may further include applying a forming mandrel vacuum bag over the composite material and curing the composite tooling material followed by de-bagging and trimming a cured composite bag carrier. The method may additionally include applying rubber material over the cured composite bag carrier and curing the rubber material to form a cured vacuum barrier or bladder. The method may also include washing out the soluble forming mandrel and adding a vacuum fitting to an end of the cured blade.

The present disclosure also includes a method of manufacturing a composite part which may include providing an outer mold line (OML) tool having an OML tool surface. The method may include loading a bag carrier having an over-molded bladder within a composite part. The bag carrier may have a bag carrier tool surface that may be configured complementary to a part inner surface of the composite part. The method may include positioning the composite part between the OML tool surface and the bladder, drawing a vacuum on a tool interior, and applying an internal compaction pressure on the composite part against the OML tool surface in response to drawing the vacuum.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
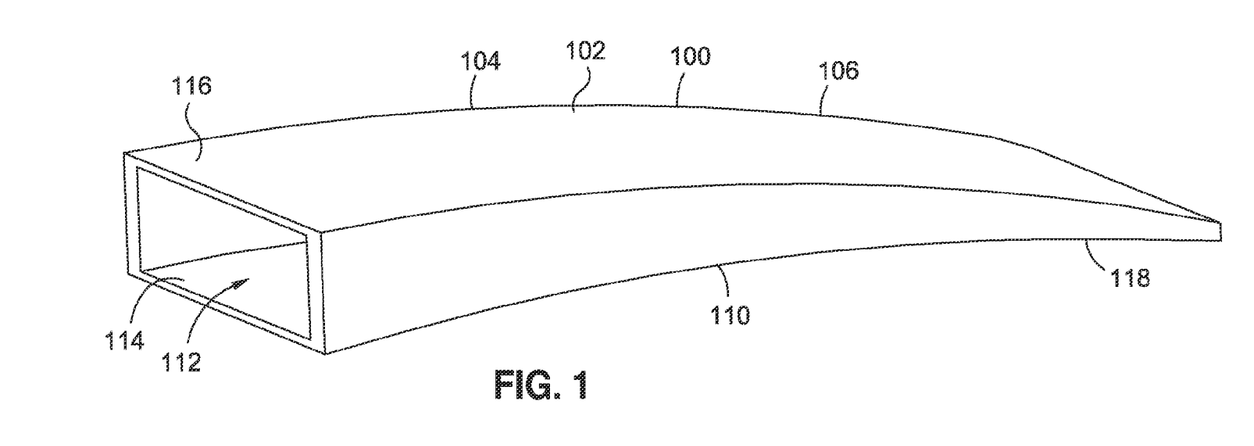
FIG. 1 is a perspective view of a composite part that may be fabricated using a vacuum barrier system disclosed herein.

Referring now to the drawings wherein the showings are for purposes of illustrating preferred and various embodiments of the disclosure, shown in FIG. 1 is a composite article 100 which may be processed in a closed mold tool using a vacuum barrier system 200 (FIG. 2) and method disclosed herein. The composite article 100 has a skin having a part outer surface 116 and a part inner surface 114 and defining a generally hollow part interior 112. The composite article 100 in FIG. 1 has a hollow rectangular cross section. However, the vacuum barrier system 200 disclosed herein may be implemented for manufacturing composite articles 100 having any geometry including a complex three-dimensional geometry (not shown) that may be defined by internal components (not shown) such as stiffeners extending from the part inner surface 114.

In FIG. 1, the composite article 100 is shown having a curvature along a part length 110 and including non-draftable geometry 118. Advantageously, such non-draftable geometry 118 may be formed using a reusable bag carrier 206 (FIG. 2) and over-molded reusable bladder 300 (FIG. 2) as part of the vacuum barrier system 200 disclosed herein. In this regard, the reusable bag carrier 206 and bladder 300 disclosed herein advantageously provide a relatively simple and cost-effective means for producing unitized, monolithic, integrally-formed composite articles 100 having dimensionally-accurate inner surfaces and dimensionally-accurate outer surfaces with complex three-dimensional geometry and/or non-draftable geometry 118. In the present disclosure, the term "vacuum barrier" may be used synonymously with the term "bladder" and the term "vacuum bag." In this regard, the bladder 300 as used herein comprises a relatively thin, compliant film that may be formed over or molded over the bag carrier 206 and which functions as an elastic vacuum barrier. As described below, the bag carrier 206/bladder 300 may be enclosed within a redundant thin film vacuum bag 430 to extend the useful life of the bladder 300. The redundant thin film vacuum bag 430 may be discarded after one or more uses.

Figure 2:
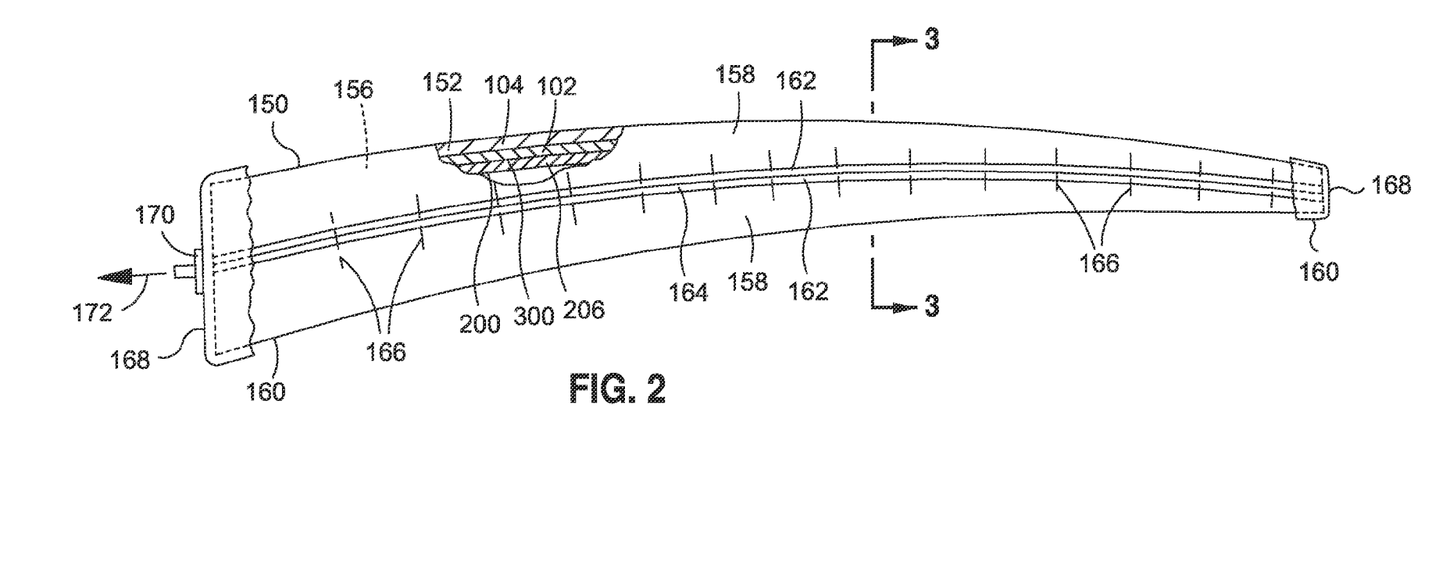
FIG. 2 is a side view of a tooling system that may be implemented for processing a composite part.

Referring to FIG. 2, shown is a side view of a closed mold tooling system 150 which may be implemented for consolidating and/or curing a composite part 102. In the embodiment shown, the OML tool 152 is comprised of two OML tool halves 158 including an upper half 158 a lower half 158 collectively defining an OML tool surface 154 encapsulating a composite part 102 to be consolidated using the vacuum barrier system 200. The upper half 158 and the lower half 158 may include tool flanges 162 extending along the length of the OML tool 152 such that the upper half 158 and the lower half 158 may be mated to one another along the seams 164 using a plurality of mechanical fasteners 166 or with other means. The OML tool 152 may include ribs (not shown) or other stiffening members (not shown) extending along the outer surface of OML tool 152 and which may provide the OML tool 152 with sufficient stiffness to react internal compaction pressure 174 generated during consolidation of the composite part 102 using the vacuum barrier system 200.

In FIG. 2, the illustrated embodiment of the OML tool 152 may include one or more tool ends 160 that may be generally open. External vacuum bags 168 may be sealed over the tool ends 160 using a bag edge sealant (not shown) such as vacuum barrier or vacuum bag sealant or a high-temperature vacuum bag sealant tape to sealingly enclose the tool interior 156. One or more of the external vacuum bags 168 may include vacuum fittings 170 that may be fluidly coupled to a vacuum source 172 such that vacuum pressure may be applied to the tool interior 156 to generate internal compaction pressure 174 against the part inner surface 114 of the composite part 102 for consolidation thereof. The tooling system 150 may include other gas flow hardware (not shown) to allow for the application of autoclave pressure and/or heating to apply thermal energy and pressure to the composite part 102 for consolidation and/or curing thereof.

Figure 3:
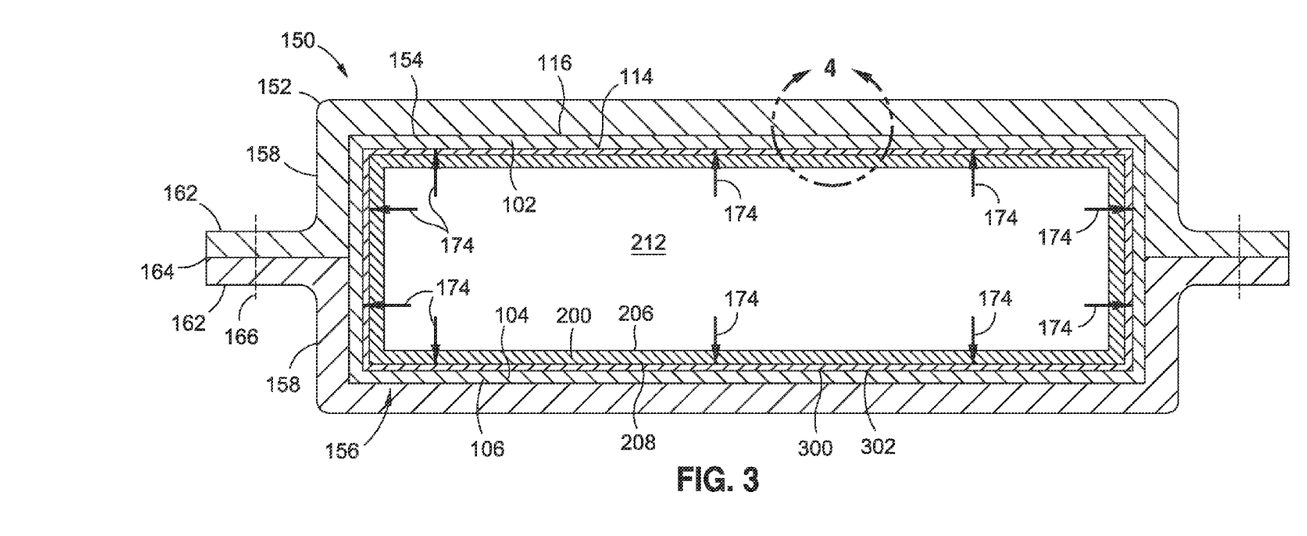
FIG. 3 is a cross-sectional view of the tooling system of FIG. 2 and illustrating a vacuum barrier system comprising a bag carrier having a bladder molded over the bag carrier.

Referring to FIG. 3, shown is a sectional view of the tooling system 150 and illustrating the composite part 102 and the vacuum barrier system 200 captured between the mated halves 158 of the OML tool 152. The OML tool surface 154 may have a relatively high level of surface finish or a relatively low surface roughness to provide a smooth surface finish to the composite part 102 that may be cured within the tooling system 150. The OML tool 152 may be provided in any one of a variety of different sizes, shapes, and configurations and is not limited to the configuration shown in FIG. 2-3. In this regard, the tooling system 150 and method may be configured for manufacturing composite parts 102 having any one of a variety of different sizes and configurations. For example, the tooling system 150 may be sized and configured for manufacturing an aerodynamic structure 106 (FIG. 1) such as a winglet of an aircraft wing, or other aerodynamic structures such as a wing, a fuselage, a control surface, or any one of a variety of other aerodynamic or non-aerodynamic structures, without limitation.

In FIG. 3, the composite part 102 may be comprised of one or more skins and one or more internal components (not shown). The skin and/or the internal components may be formed as composite layups 104 such as a laminate of uncured or pre-cured composite material including pre-impregnated fiber-reinforced material (e.g., pre-preg). The tooling system 150 may facilitate the co-bonding, co-curing, and/or secondary bonding of multiple composite layups 104 during the application of heat and internal compaction pressure 174. Advantageously, the vacuum barrier system 200 and method disclosed herein provides for the application of substantially uniform internal compaction pressure 174 to a composite part 102

In FIG. 3, the vacuum barrier system 200 may include the bag carrier 206 and an elastic bladder 300 that may be directly molded over the bag carrier 206 in a process described below. The bag carrier 206 may be sealed within the bladder 300. The bag carrier 206 may comprise a one-piece structure having a bag carrier tool surface 208 and a bag carrier inner surface. However, the bag carrier 206 may be formed as a multi-piece structure (not shown) with an over-molded bladder 300. The bag carrier tool surface 208 may be shaped and configured complementary to a part inner surface 114 of a composite part 102. The bag carrier 206 may have a generally hollow bag carrier interior 212 and/or a hollow bag carrier channel 214 that may extend at least partially through the bag carrier 206 along a bag carrier length 218. The hollow bag carrier interior 212 and/or a hollow bag carrier channel 214 may facilitate heat flow through the bag carrier 206 for uniform heating of the different areas of the composite part 102.

In FIG. 3, internal compaction pressure 174 may be applied to the composite part 102 by drawing a vacuum on the tool interior 156 from a vacuum source 172 (FIG. 2) that may be fluidly coupled to an external vacuum bag 168 (FIG. 2). During the application of internal compaction pressure 174, the composite part 102 may be heated to a predetermined temperature for a predetermined period of time to allow for consolidation and curing of the composite part 102 into a unitized, monolithic composite structure. Heat may be applied to the composite part 102 such as by placing the tooling system 150 within an autoclave or a convection oven or by direct heating such as with resistance elements (not shown) or heating pads applied to or integrated with the OML tool 152.

Figure 4:
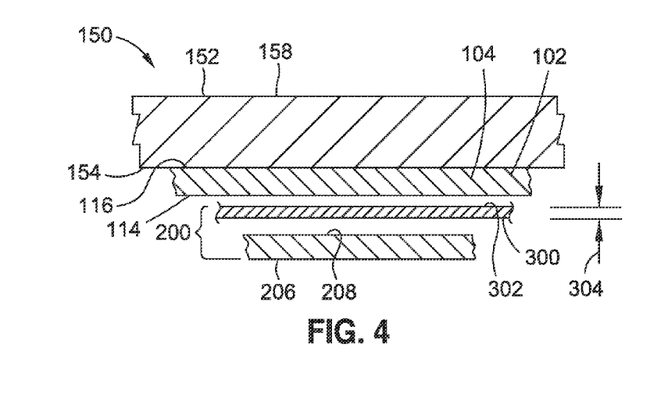
FIG. 4 is an exploded partial cross-sectional view of the tooling system illustrating the arrangement of the bag carrier and the bladder relative to the composite part.

Referring to FIG. 4, shown is a diagrammatic cross section of the tooling system 150 illustrating the composite part 102 sandwiched between the bladder 300 and the OML tool surface 154. The bladder 300 may be formed of natural and/or synthetic polymeric material such as a nylon material (e.g., polyamide material) or rubber material. For example, the bladder 300 may be formed of natural or synthetic rubber such as silicone rubber, latex rubber, fluoropolymeric rubber such as Viton rubber, or other types of rubber having relatively high durability. The bladder 300 may be provided in a bladder thickness 304 that may be thicker than conventional thin film vacuum bags. In an embodiment, the bladder 300 may have a bladder thickness 304 of 0.005 to 0.25 inch although thicknesses outside of the 0.005 to 0.25 inch range are contemplated. The bladder thickness 304 may be at least partly dependent upon the type of bladder 300 material. For example, a bladder 300 formed of nylon may have a relatively small bladder thickness 304 such as from approximately 0.005 to 0.010 inch. A bladder 300 formed of Viton™ rubber (i.e., a fluoropolymer elastomer commercially available from DuPont Corporation) may have a thickness of from approximately 0.06 to 0.18 inch and preferably a thickness of approximately 0.125 inch. A bladder 300 formed of silicone rubber or latex rubber may have a thickness of from approximately 0.125 to 0.250 inch.

In FIG. 4, the bag carrier 206 may be formed of any one of a variety of materials. In an embodiment, the bag carrier 206 may be formed of composite material, metallic material, polymeric material, and/or ceramic material, or any combination thereof. Composite material may comprise any suitable thermoplastic or thermosetting material. For example, the bag carrier 206 may be formed of carbon fiber-reinforced polymeric material, fiberglass fiber-reinforced polymeric material or other composite materials that have favorable thermal conductivity and which may provide a lightweight and stiff structure. Advantageously, a composite bag carrier 206 may be formed with an over-molded rubber bladder 300 in a relatively simple and rapid process requiring minimal tooling as described in greater detail below.

Figure 12:
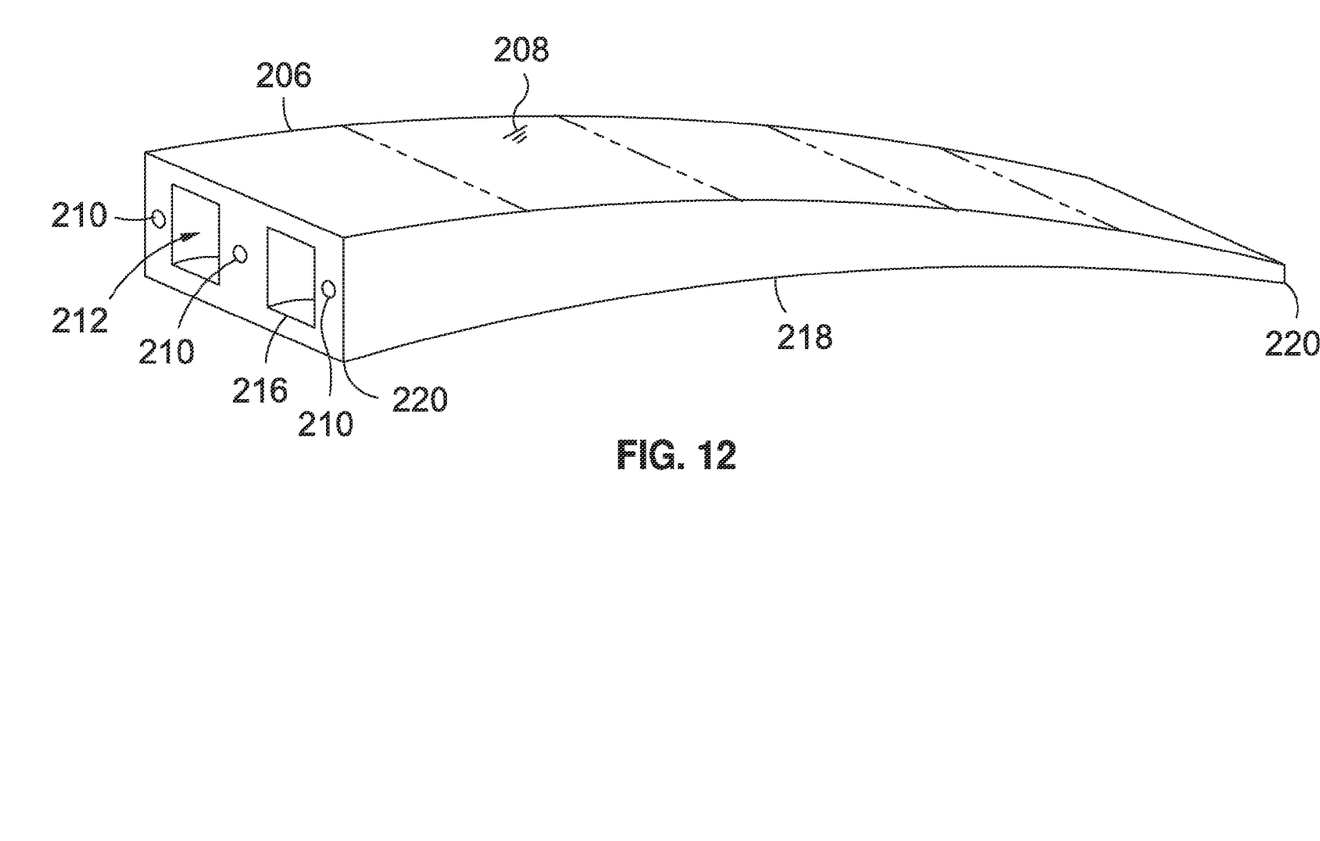
FIG. 12 is a perspective view of a bag carrier formed by additive manufacturing.

In FIG. 4, the bag carrier 206 may also be formed of metallic material such as aluminum, steel, or any other lightweight material that is preferably compatible with the composite material of the composite part 102 from a thermal expansion standpoint. The bag carrier 206 may also be formed of ceramic material such as soluble ceramic foam as shown in FIG. 12 and described below. In this regard, the bag carrier 206 may preferably be formed as a relatively light and stiff, hollow structure, providing relatively good thermal conductivity and which provides a high level durability for use over many part production cycles.

Figure 5:
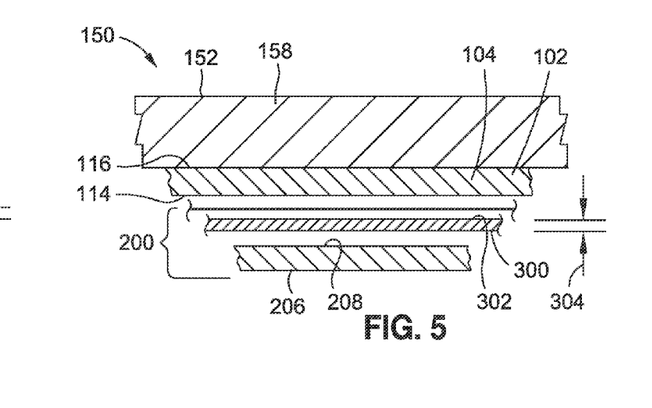
FIG. 5 is an exploded partial cross-sectional view of an arrangement of the vacuum barrier system in an alternative embodiment having a thin film vacuum bag interposed between the bladder and the composite part.

Referring to FIG. 5, shown is an alternative embodiment of a vacuum barrier system 200 having a thin film vacuum bag 212 applied over the bladder 300 such that the thin film vacuum bag 212 is interposed between the bladder tool surface 302 and the part inner surface 114 of the composite part 102. The thin film vacuum bag 212 may provide a redundant gas barrier for sealing the bag carrier 206 and minimizing the risk of a loss of internal compaction pressure 174 during consolidation and/or curing. In addition, the thin film vacuum bag 212 may be formed of polymeric material that is chemically compatible with the composite material of the composite part 102. The thin film vacuum bag may extend the useful life of the bladder 300 and may be discarded after one or more uses.

Figure 6:
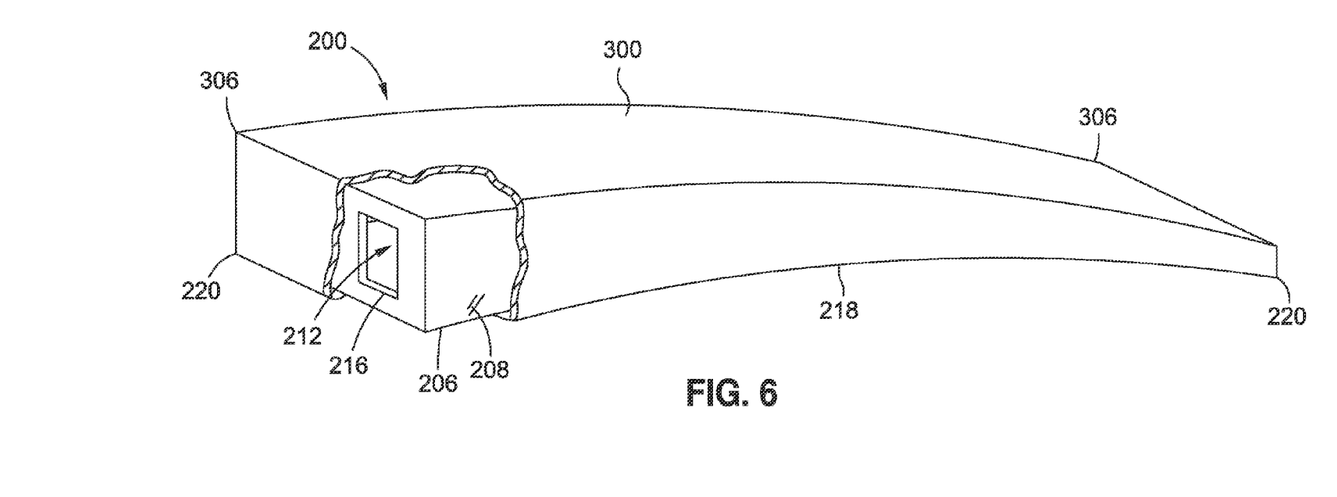
FIG. 6 is a perspective view of an embodiment of a vacuum barrier system comprising the bag carrier and bladder.

Referring to FIG. 6, shown is a perspective view of an embodiment of a bag carrier 206 having a bladder 300 molded over the bag carrier 206. The bladder 300 may include one or more vacuum fittings 170 installed on a bladder end 306. However, the vacuum fitting 170 may installed at any location on the bladder 300. The vacuum fitting 170 may facilitate the drawing of a vacuum on the interior of the bladder 300 to pull the bladder 300 material against the sides of the bag carrier 206 to facilitate installing the bag carrier 206/bladder 300 within the part interior 112 of the composite part 102. After the bag carrier 206/bladder 300 is installed within the part interior 112, the vacuum fitting 170 may be closed to seal the interior of the bladder 300.

Figure 7:
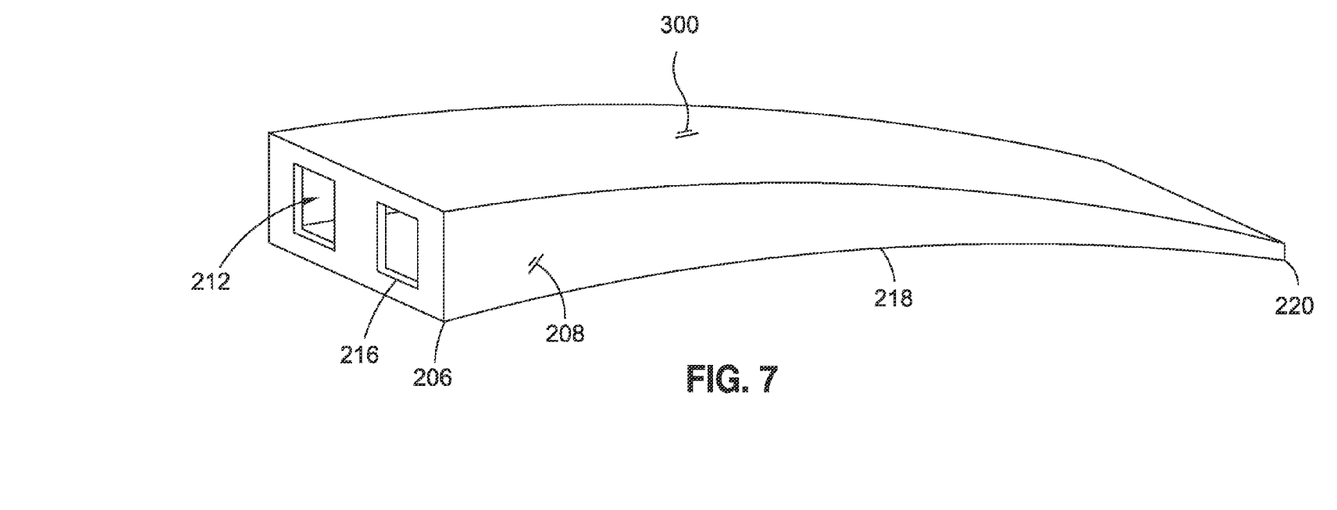
FIG. 7 is a perspective view of an embodiment of a bag carrier.

Referring to FIG. 7, shown is a perspective view of a bag carrier 206 with the bladder removed. As indicated above, the bag carrier 206 is preferably hollow to reduce weight and improve air flow and/or heat flow through the bag carrier 206. In this regard, the bag carrier 206 may include one or more openings 216 on one or both bag carrier ends 220. The openings 216 may facilitate air flow and heat flow and may facilitate wash-out of a soluble detail 250 that may be assembled with the bag carrier 206 as described below.

Figure 8:
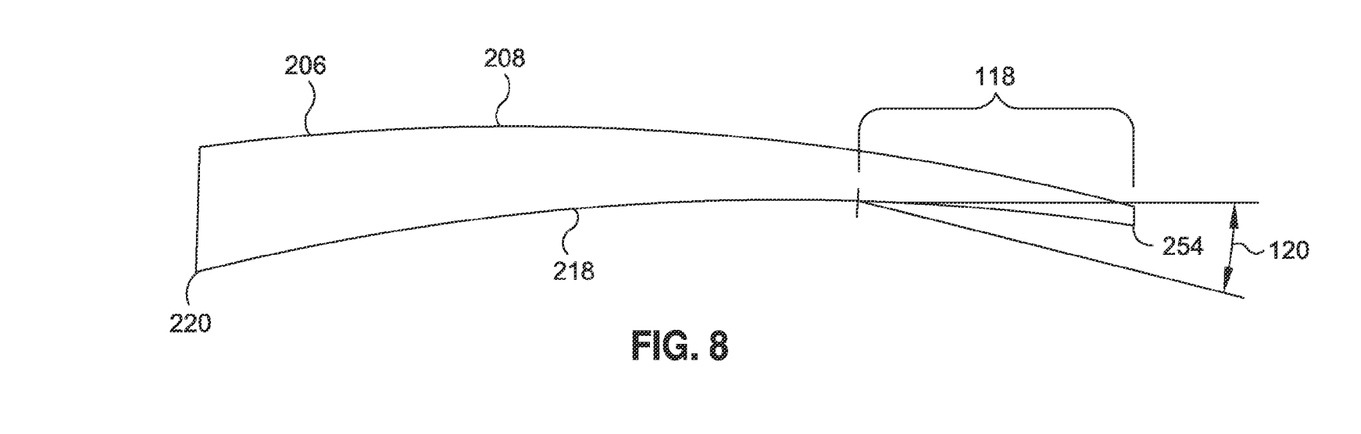
FIG. 8 is a side view of a bag carrier for a composite part having non-draftable geometry.

Referring to FIG. 8, shown is side view of an embodiment of a bag carrier 206 for a composite part 102 having non-draftable geometry 118. As indicated above, such non-draftable geometry 118 may comprise geometry of the composite part 102 where a rigid tool may not be removable or extractable from the part interior 112 following curing of the composite part. Such non-draftable geometry 118 may be defined as locations on the bag carrier 206 that prevent the bag carrier 206 from being slid out of the composite part 102. For example, non-draftable geometry may comprise locations wherein a pair of opposing bag carrier tool surfaces 208 form a draft angle 120 of less than 2 degrees relative to one another along a direction from which the bag carrier 206 may be slid out of the composite part 102. In FIG. 8, non-draftable geometry 118 occurs at the end of the bag carrier 206 that tapers down to a reduced height. A bag carrier 206 extending into the location of non-draftable geometry 118 would become trapped and would not be extractable following curing of the composite part 102.

Figure 9:
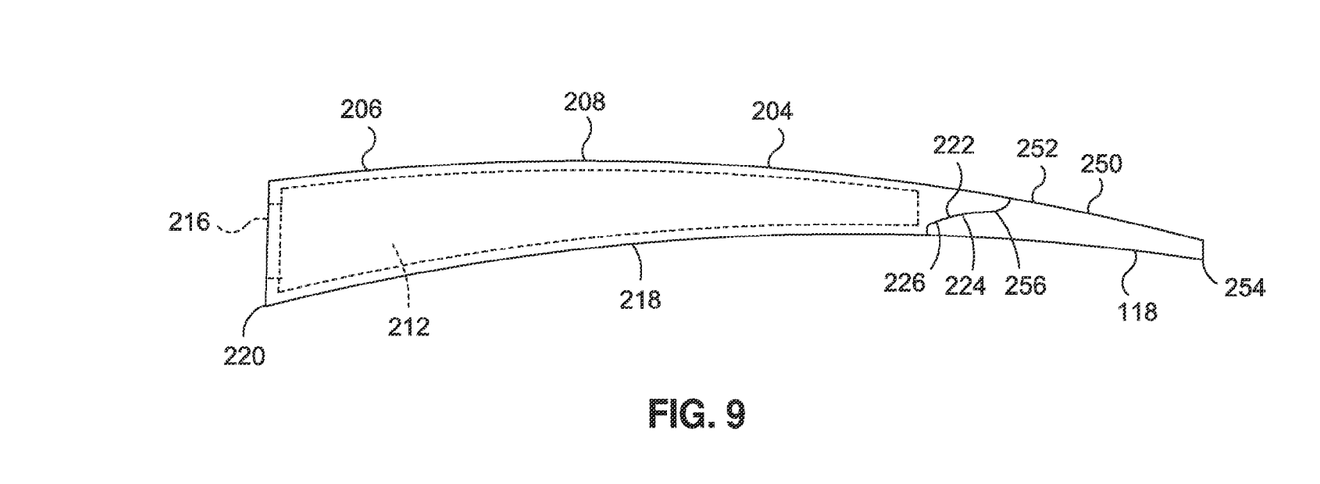
FIG. 9 is a side view of an embodiment of a bag carrier assembly comprising a bag carrier coupled with a soluble detail.

Referring to FIG. 9, shown is a side view of a bag carrier assembly 204 comprising a generally hollow bag carrier 206 and a generally solid soluble detail 250 that may be assembled with or joined to the hollow bag carrier 206. Although not shown, the bag carrier assembly 204 may be enclosed or covered by a bladder 300. The soluble detail 250 may describe the trapped surfaces that represent the non-draftable geometry 118 of the composite part 102. In this regard, the soluble detail 250 may be located within the part interior 112 at the location of the non-draftable geometry 118 and may be formed of soluble material that may be dissolved or solubilzed following curing of a part to allow the soluble detail 250 to be washed out of the bladder 300 as described in greater detail below.

Figure 10:
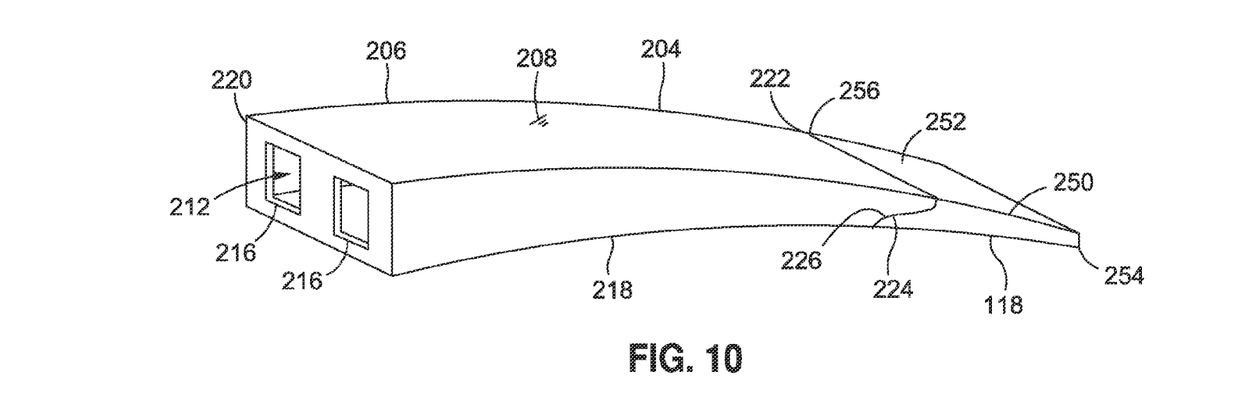
FIG. 10 is a perspective view of an embodiment of the bag carrier assembly of FIG. 9.

Referring to FIG. 10, shown is a perspective view of an embodiment of a bag carrier assembly 204 comprising a soluble detail 250 that may be paired with a composite bag carrier 206. The soluble detail 250 may be formed of polymer ceramic material or other soluble tooling material. Although shown as being formed on a single end of the bag carrier 206, the soluble detail 250 may be located at any of one or more locations on the bag carrier 206. In an embodiment, the soluble detail 250 may be removed by applying a polar solvent such as water, alcohol, or other solvent, to facilitate removal of the soluble detail 250 from the bladder 300. The soluble detail 250 may be subjected to a solvent spray or the composite part 102 may be immersed in a solvent bath to allow the soluble detail 250 to solubilize to facilitate pouring the material out of the openings 216 and access holes 426 (FIG. 13G) respectively formed in the bag carrier 206 and bladder 300.

Figure 11:
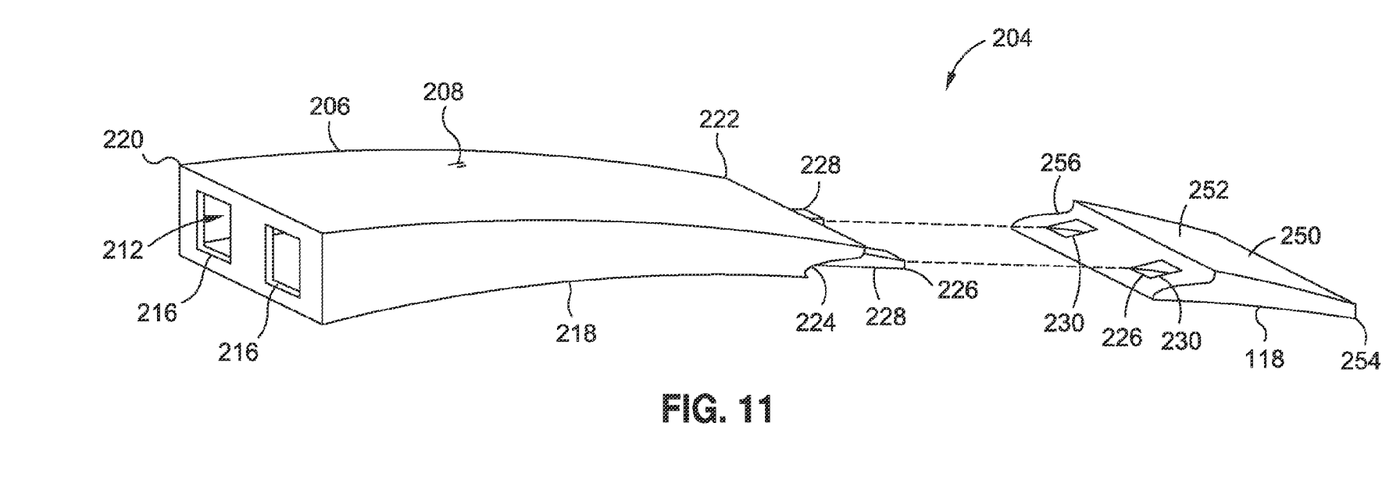
FIG. 11 is an exploded perspective view of a bag carrier of FIG. 10 illustrating keyed geometry at a bag carrier/soluble detail interface.

Referring to FIG. 11, shown is an embodiment of a bag carrier/soluble detail interface 224 configured to provide positive positioning of the soluble detail 250 relative to the bag carrier 206. In this regard, the bag carrier 206 may have a free end 220 and a keyed end 222. The bag carrier keyed end 222 may include keyed geometry 226. The soluble detail 250 may also have a free end 254 and a soluble detail keyed end 256 which may be configured complementary to the bag carrier keyed end 222. For example, the bag carrier keyed end 222 may include one or more tabs 228 that may be sized and configured to be slidably receivable within a corresponding pair of slots 230 formed in the soluble detail keyed end 256. The keyed geometry 226 may be configured to allow joining of the soluble detail 250 to the bag carrier 206 with positive positioning. In this regard, the keyed geometry 226 is preferably configured to prevent movement of the soluble detail 250 such as lateral, axial, bending, and/or rotational movement of the soluble detail 250 relative to the bag carrier 206. The keyed geometry 226 may be provided in any configuration and is not limited to that which is illustrated in FIG. 11.

Referring to FIG. 12, shown is an alternative embodiment of the bag carrier 206 optionally formed of polymeric material and/or ceramic material. In an embodiment, the ceramic material may comprise soluble ceramic material which may be similar to the polymeric material and/or ceramic material from which the soluble detail 250 may be formed. The polymeric or ceramic material may be soluble in a polar solvent such as water or alcohol. In an embodiment, the ceramic bag carrier 206 may be formed by curing a predetermined amount of foam mixture (not shown) within a closed metal mold (not shown) that may be configured for manufacturing bag carriers on a production basis. One or more bag carrier channels 214 may be formed in the bag carrier 206 during the forming process to facilitate air flow and/or heat flow through the bag carrier 206. The resulting ceramic bag carrier 206 may be sealed with a polymer layer (not shown) to seal the bag carrier 206 from the environment and from the resin in the composite part 102. In this regard, the polymer layer is preferably compatible with the composite material system of the composite part 102. In an embodiment, the polymer layer may comprise a fluorinated polymer such as polytetrafluoroethylene (e.g., Teflon™ tape) and may be porous or non-porous through-the-thickness. However, the polymer layer may be formed of any material, without limitation.

In FIG. 12, in an embodiment, the bag carrier 206 may optionally be formed by an additive manufacturing process such as stereo lithography and/or three-dimensional printing. For example, a ceramic bag carrier 206 may be formed using three-dimensional printing based upon a computer aided design (CAD) model (not shown) of the composite part 102. Three-dimensional printing may advantageously avoid development and tooling costs normally associated with forming a mandrel. Furthermore, three-dimensional printing may reduce the time and costs associated with design changes to the size, shape, or configuration that may occur during development of the composite part 102. In an embodiment, the ceramic bag carrier 206 may include one or more reinforcing members 210 to stiffen the ceramic foam bag carrier 206 and allow the bag carrier 206 to be handled. A rubber bladder 300 (FIG. 6) comprising a thin, compliant or elastic film may be applied over the bag carrier 206 in the manner described above.

Figure 13A:
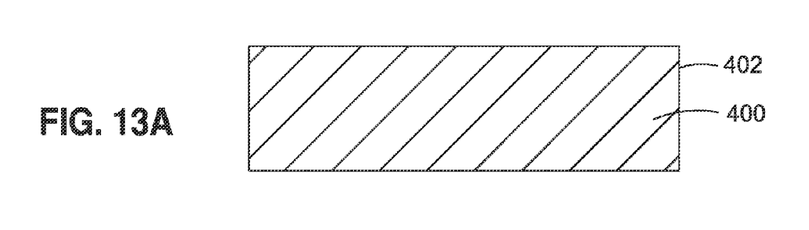
FIG. 13A is a sectional view of a soluble forming mandrel as may be used in a process for fabricating a composite bag carrier having an over-molded bladder.
Figure 13B:
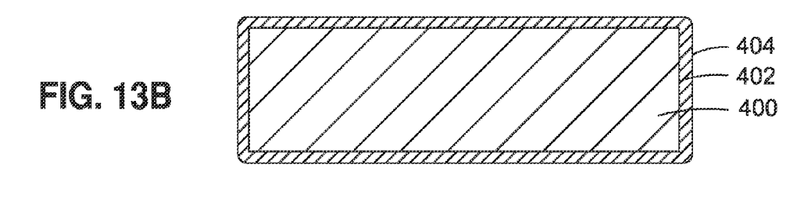
FIG. 13B is a sectional view of a composite layup applied over the soluble forming mandrel in the process for fabricating the composite bag carrier having the over-molded bladder.
Figure 13C:
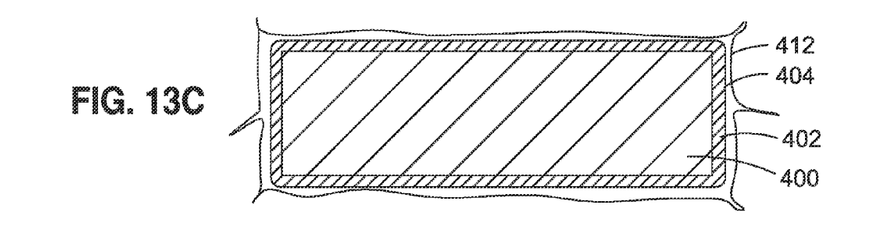
FIG. 13C is a sectional view of a forming mandrel vacuum bag applied over the composite layup prior to autoclave curing the composite layup.
Figure 13D:
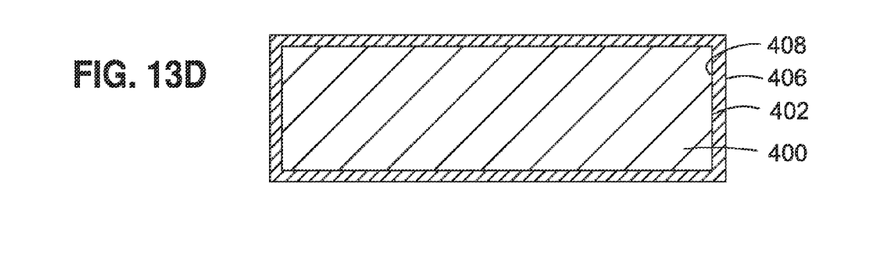
FIG. 13D is a sectional view of a cured composite bag carrier following the de-bagging and trimming thereof.
Figure 13E:
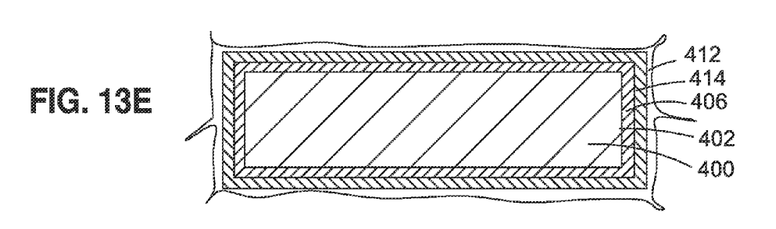
FIG. 13E is a sectional view of rubber material applied over the cured composite bag carrier and the application of the forming mandrel vacuum bag for curing and/or drying the rubber material.
Figure 13F:
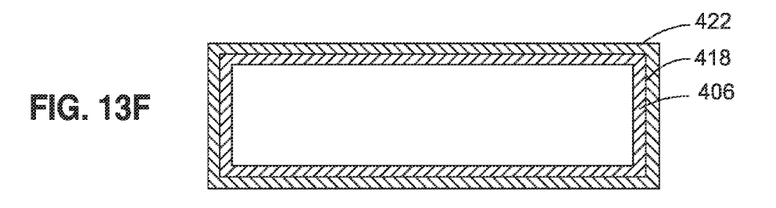
FIG. 13F is a sectional view of the composite bag carrier having the over-molded bladder following washout of the soluble forming mandrel.
Figure 13G:
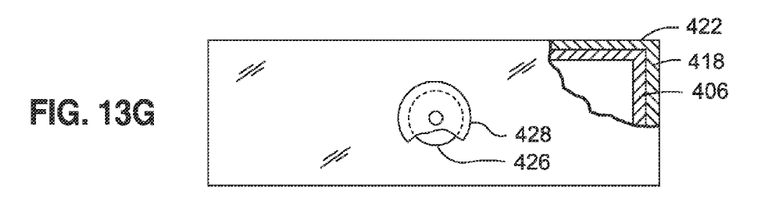
FIG. 13G is an end view of the composite bag carrier with over-molded mandrel and illustrating the installation of a vacuum fitting to an end of the cured bladder.
Figure 13H:
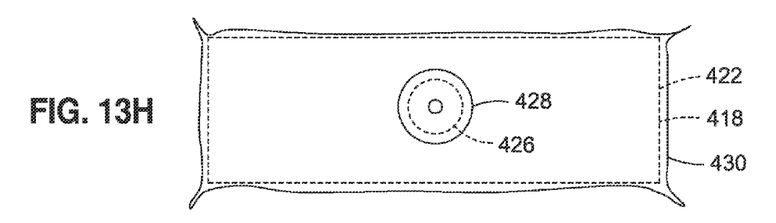
FIG. 13H is an end view of a redundant thin film vacuum bag applied over the composite bag carrier with over-molded bladder.
Figure 14:
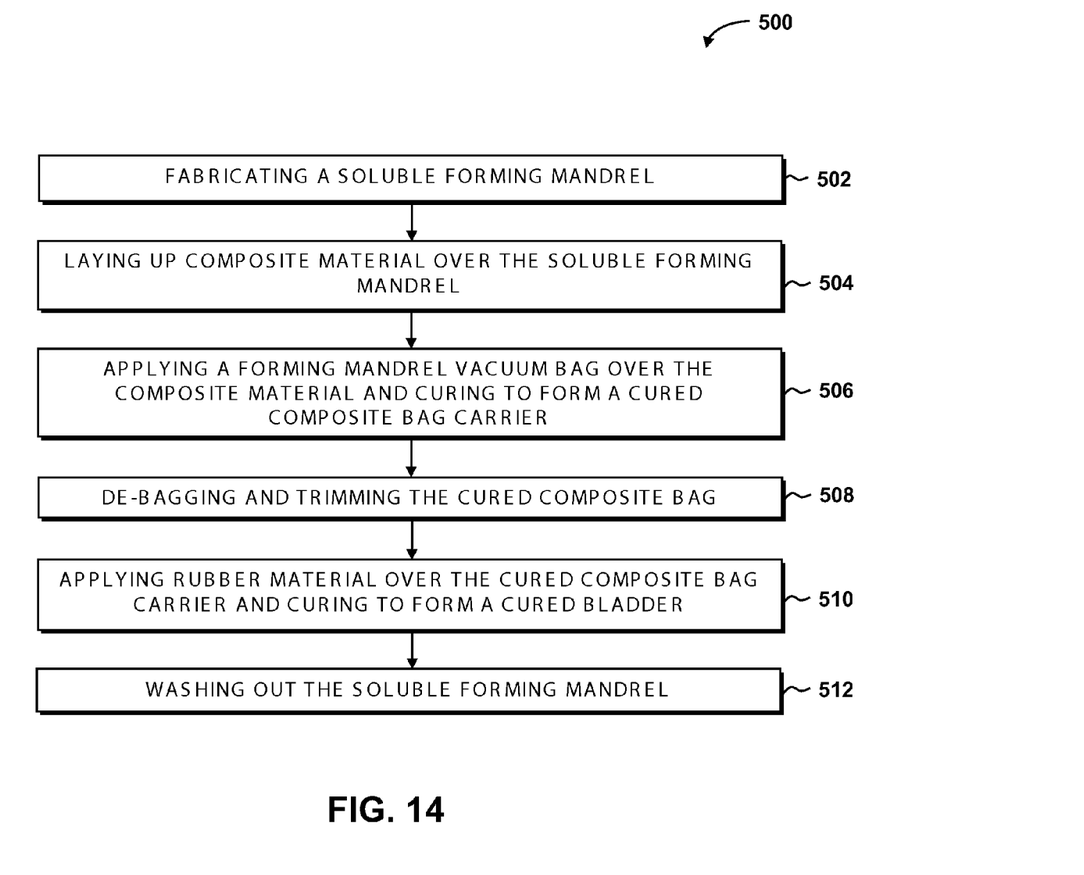
FIG. 14 is a flow chart illustrating one or more operations that may be included in an embodiment of a method of fabricating a vacuum barrier system.

Referring to FIGS. 13A-13H and FIG. 14, shown in FIG. 14 is a flow diagram of a method 500 of fabricating a vacuum barrier system 200. The method 500 is illustrated in the schematic diagrams of FIG. 13A-13H. The vacuum barrier system 200 may include an elastic or rubber bladder 300 or film applied to or molded directly over a generally hollow bag carrier 206 formed of composite material.

Step 502 of the method 500 of FIG. 14 may include fabricating a soluble forming mandrel 400 such as from ceramic foam and having a forming mandrel outer surface 402 that substantially duplicates the shape and configuration of the inner surfaces of the composite bag carrier 206. FIG. 13A is a sectional view of a rectangular soluble forming mandrel 400 as may be used in a process for fabricating a rectangular composite bag carrier 206 having an over-molded bladder 300 similar to that which is illustrated in FIG. 6. In an embodiment, the soluble forming mandrel 400 may be formed by pouring a predetermined amount of ceramic foam into dedicated mold (not shown) and allowing the ceramic foam to cure. Alternatively, a forming mandrel may be formed by rapid prototyping or an additive manufacturing process such as three-dimensional printing the forming mandrel based on a CAD file of the composite part 102 and the same manner as described above with regard to forming the ceramic bag carrier 206 illustrated in FIG. 12.

Step 504 of the method 500 of FIG. 14 may include laying up composite tooling material (e.g., prepreg) over the soluble forming mandrel 400 as shown in FIG. 13B. In an embodiment, handling fittings (not shown) may be secured to opposing ends of the soluble forming mandrel 400 to allow for manipulation of the orientation of the soluble forming mandrel 400 during application of the composite material (e.g., prepreg). For example, composite material such as prepreg may be applied to the soluble forming mandrel 400 by filament winding or fiber placement using an automated tape laying machine, or by any other method including manual layup for applying composite material (e.g., prepreg).

Step 506 of the method 500 of FIG. 14 may include applying a forming mandrel vacuum bag 412 over the composite layup with the forming mandrel inside the composite layup 404 as shown in FIG. 13C. The forming mandrel vacuum bag 412 may be formed of conventional thin film vacuum bag materials. A vacuum fitting 170 may be applied to an end of the vacuum bag and a vacuum may be drawn for consolidating the composite layup 404. The assembly may be autoclave cured or cured within a convection oven.

Step 508 of the method 500 of FIG. 14 may include removing the forming mandrel vacuum bag 412 to reveal a cured composite bag carrier 406 as shown in FIG. 13D. The method may include forming the bag carrier 206 with a hollow bag carrier interior 212. The cured composite bag carrier 406 may be trimmed. Handling fixtures optionally included on the ends of the forming mandrel 400 may facilitate holding and orienting the cured composite bag carrier 406 during the removal of the forming mandrel vacuum bag 412 and trimming of the cured composite bag carrier 406.

Step 510 of the method 500 of FIG. 14 may include applying rubber material 414 over the cured composite bag carrier 406 as shown in FIG. 13E. For example, rubber material 414 such as silicone rubber, latex rubber, Viton™ rubber may be applied over the cured composite bag carrier 406 and a desired thickness may be dependent in part upon the type of rubber material 414. The rubber material 414 may be allowed to cure and/or dry. A forming mandrel vacuum bag 412 may be applied over the rubber material 414 to assist in consolidating and/or curing the rubber material 414 into a cured bladder 418.

Step 512 of the method 500 of FIG. 14 may include washing out the soluble forming mandrel 400 from the interior of the cured composite bag carrier 406 as shown in FIG. 13F. In an embodiment, access holes 426 (FIG. 13G) may be included on one or more bladder ends 424 of the cured bladder 418 to facilitate introducing solvent into the interior of the cured composite bag carrier 406. The solvent may comprise water, alcohol, or any other polar solvent for solubilizing the forming mandrel 400.

Step 514 of the method 500 of FIG. 14 may include adding a vacuum fitting 170 to a bladder end 424 of the cured bladder 418 as shown in FIG. 13G. The vacuum fitting 170 may be fluidly coupled to a vacuum source (not shown). As indicated above, a vacuum may be drawn on the cured bladder 418 to draw the cured bladder 418 against the bag carrier tool surfaces 208 to assist in installing the bag carrier 206 into a composite part 102 and/or to assist in assembling the composite bag carrier 206 with one or more internal components (not shown) of a three-dimensional composite part (not shown). A redundant thin film vacuum bag 430 may be applied over the over the cured bladder 418/composite bag carrier 406 to provide additional protection against leakage.

Optionally, the method may include assembling a soluble detail 250 with the bag carrier 206 as shown in FIG. 11. The process may include forming the bag carrier 406 and the soluble detail 250 with a keyed geometry 226 for coupling the bag carrier 406 and the soluble detail 250 at a bag carrier/soluble detail interface 224 as described above. The method may include forming the soluble detail 250 in a shape that is complementary to non-draftable geometry 118 of a composite part 102. In this regard, the soluble detail 250 may describe trapped surfaces that may be associated with the composite part 102. The soluble detail 250 may be removably coupled to the bag carrier 406. The method may further include enclosing or covering the soluble detail 250 and the bag carrier 406 with a rubber bladder 418. The composite bag carrier 406/soluble detail 250 may be enveloped within the rubber bladder 418.

Figure 15:
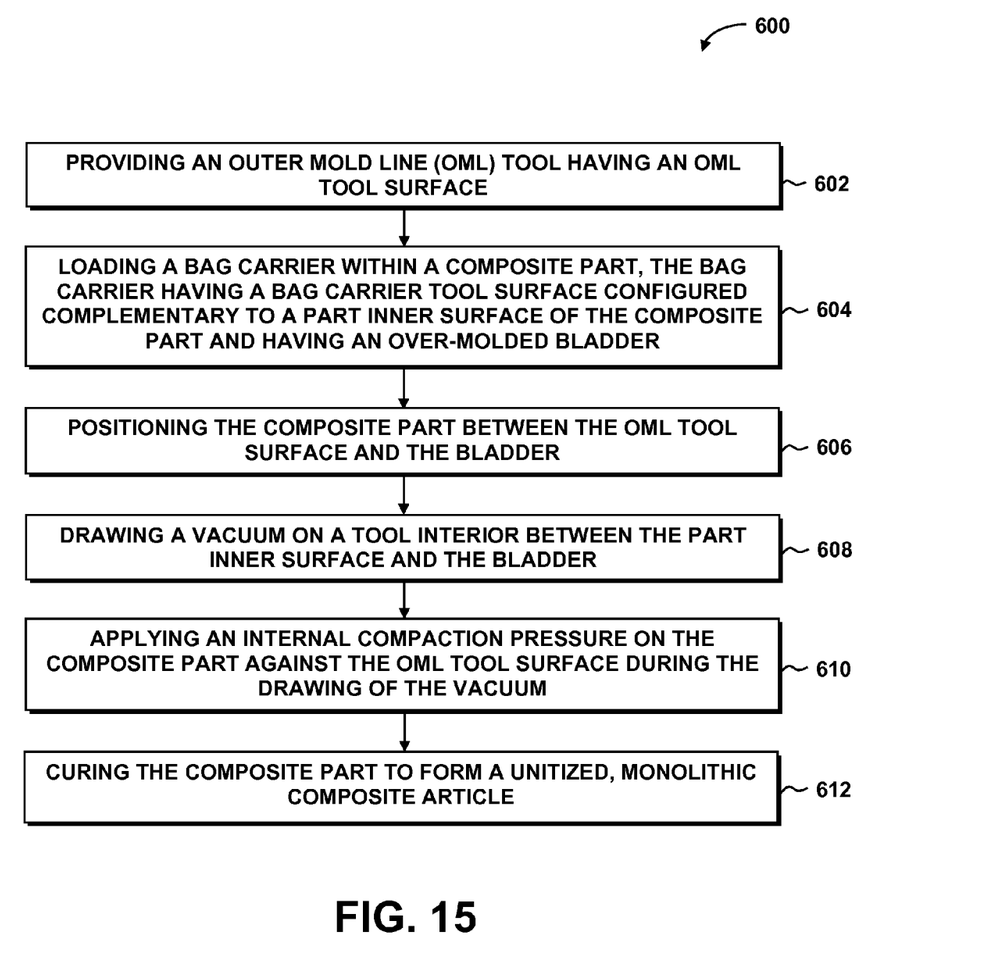
FIG. 15 is a flow chart illustrating one or more operations that may be included in an embodiment of a method of fabricating a composite part using the vacuum barrier system.

Referring to FIG. 15, shown is an embodiment of a method 600 of manufacturing a composite article 100 (FIG. 1) using the vacuum barrier system 200 (FIG. 2) disclosed herein. Advantageously, the use of the vacuum barrier system 200 and method provides a means for forming composite parts to a high level of accuracy using a reusable bag carrier 206 and a rubber bladder 300 (FIG. 2) that is durable and which provided a relatively long useful life. In addition, the method provides the means for forming composite parts 102 with reduced recurring cost and flow times.

Step 602 of the method may include providing an outer mold line (OML) tool 152 (FIG. 2) having an OML tool surface 154 (FIG. 3) such as the OML tool 152 illustrated in FIGS. 2-3. In the embodiment shown, the OML tool 152 may be formed as a female closed mold comprised of an upper tool half 158 and a lower tool half 158. However, the OML tool 152 may be provided in any configuration, without limitation. The method may further include applying a redundant thin film vacuum bag over the bladder 300 as mentioned above.

Step 604 of the method 600 of FIG. 15 may include loading a bag carrier 206 (FIG. 3) within a composite part 102. The bag carrier 206 may include a bag carrier tool surface 208 (FIG. 3) that may be configured complementary to a part inner surface 114 of the composite part 102. The bag carrier 206 may include an over-molded bladder 300 that may be formed of the rubber material 414 as described above.

Step 606 of the method 600 of FIG. 15 may include positioning the composite part 102 (FIG. 3) between the OML tool surface 154 and bladder 300. For example, FIG. 3 illustrates the part outer surface 116 in contact with the OML tool surface 154. The part inner surface 114 may be substantially in contact with the rubber bladder 300 tool surface. In this regard, the bag carrier 206 may be sized and configured to provide a substantially net fit with the inner surfaces 114 of the composite part 102. By minimizing the gap between the bladder tool surface 422 and the part inner surface 114, dimensional accuracy of the cured composite article 100 as improved.

Step 608 of the method 600 of FIG. 15 may include drawing a vacuum on a tool interior 156 (FIG. 3) between the part inner surface 114 (FIG. 3) and the bladder 300 (FIG.

3). For example, the OML tool 152 may include one or more external vacuum bags 168 (FIG. 2) which may include a vacuum fitting 170 that may be fluidly coupled to a vacuum source 172 for drawing a vacuum on the tool interior 156. The drawing of the vacuum may draw trapped air, gas, and/or volatiles out of the composite part 102.

Step 610 of the method 600 of FIG. 15 may include applying an internal compaction pressure 174 (FIG. 3) on the composite part 102 (FIG. 3) against the OML tool surface 154 during the drawing of the vacuum. FIG. 3 illustrates the application of internal compaction pressure 174 by the bladder tool surface 422 against the part inner surface 114 in response to the drawing of the vacuum. The drawing of the vacuum may remove gas and fluids which may promote the consolidation of the composite part 102 and promote the movement of liquid resin (FIG. 10) for uniform application of compaction pressure.

Step 612 of the method 600 of FIG. 15 may include curing the composite part 102 (FIG. 3) into a composite article 100 (FIG. 1) such that the composite article 100 comprises a unitized, monolithic composite structure. The composite part 102 may be held at a predetermined temperature profile and at a predetermined pressure profile for a predetermined period of time to allow for consolidation and curing of the composite part 102 into a unitized, monolithic composite article 100.

For composite parts 102 (FIG. 1) having non-draftable geometry 118 (FIG. 1), the method may further include assembling a soluble detail 250 with the bag carrier 206 as illustrated in FIG. 11. The bag carrier 206 and the soluble detail 250 may be covered or enclosed by a rubber bladder 300. The method may include locating the soluble detail 250 in the region of non-draftable geometry 118 of the composite part 102. The method may include curing the composite part 102, and then removing the bag carrier 206 and the bladder 300 from the cured composite article 100 after solubilizing the soluble detail 250. The method may further include curing the composite part 102 into a composite article 100, and then solubilizing the soluble detail 250 with a solvent. The forming process may additionally include removing the solubilized soluble detail 250 from the bag carrier 206 by washing out through an access hole (not shown) that may be included in the bladder 300 and/or openings 216 that may be included in the bag carrier 206.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A vacuum barrier system for curing a composite part in a composite curing tool, comprising:
   a bag carrier assembly including a bag carrier and a soluble detail assembled on an end of the bag carrier, the bag carrier and the soluble detail configured complementary to a part inner surface of a composite part; and
   an elastic bladder molded or formed over the bag carrier assembly;
   the bag carrier including:
      a hollow bag carrier interior extending through the bag carrier along a bag carrier length and configured to allow air flow and heat flow through the bag carrier for uniform heating of different areas of the composite part; and
      the hollow bag carrier interior configured to allow for wash-out of the soluble detail from the bladder.

2. The vacuum barrier system of claim 1, wherein the bladder is formed from at least one of:
   polyamide material, silicone rubber, latex rubber, and fluoropolymeric rubber.

3. The vacuum barrier system of claim 1, wherein:
   the bladder has a thickness of 0.005 to 0.25 inch.

4. The vacuum barrier system of claim 1, wherein the bag carrier is formed of at least one of:
   composite material, metallic material, polymeric material, and ceramic material.

5. The vacuum barrier system of claim 1, wherein:
   the bag carrier is formed of a material that is soluble in a polar solvent.

6. The vacuum barrier system of claim 1, wherein:
   the composite part has non-draftable geometry; and
   the soluble detail being locatable within the part interior proximate the non-draftable geometry.

7. The vacuum barrier system of claim 1, wherein:
   the soluble detail and the bag carrier are enclosed by the bladder.

8. The vacuum barrier system of claim 1, further comprising:
   a bag carrier/soluble detail interface having a keyed geometry.

9. The vacuum barrier system of claim 1, further comprising:
   a vacuum bag applied over the bladder.

10. The vacuum barrier system of claim 1, further comprising:
    a vacuum fitting mounted to the bladder for drawing a vacuum on an interior of the bladder to pull the bladder against the bag carrier.

11. The vacuum barrier system of claim 1, further comprising:
    at least one opening formed on a bag carrier end to facilitate the air flow and/or the heat flow through the bag carrier.

12. The vacuum barrier system of claim 8, wherein:
    the keyed geometry comprises one or more tabs and slots.

13. The vacuum barrier system of claim 1, further comprising:
    a polymer layer applied to the bag carrier to seal the bag carrier from resin in the composite part.

14. A vacuum barrier system for curing a composite part in a composite curing tool, comprising:
    a bag carrier assembly including a bag carrier and a soluble detail assembled on an end of the bag carrier, the bag carrier and the soluble detail configured complementary to a part inner surface of a composite part, the soluble detail locatable within a part interior proximate non-draftable geometry of the composite part; and
    an elastic bladder molded or formed over the bag carrier assembly;
    the bag carrier including:
       a hollow bag carrier interior extending through the bag carrier along a bag carrier length and configured to allow air flow and heat flow through the bag carrier for uniform heating of different areas of the composite part; and
       the hollow bag carrier interior configured to allow for wash-out of the soluble detail from the bladder.

15. The vacuum barrier system of claim 14, further comprising:
    a vacuum bag applied over the bladder.

16. The vacuum barrier system of claim 14, wherein:
the bag carrier is formed of a material that is soluble in a polar solvent.

17. A vacuum barrier system for curing a composite part in a composite curing tool, comprising:
- a bag carrier assembly including a bag carrier and a soluble detail assembled on an end of the bag carrier, the bag carrier and the soluble detail configured complementary to a part inner surface of a composite part;
- a rubber bladder molded over the bag carrier assembly;
- the bag carrier including:
  - a hollow bag carrier interior extending through the bag carrier along a bag carrier length and configured to allow air flow and heat flow through the bag carrier for uniform heating of different areas of the composite part; and
  - one or more openings on at least one bag carrier end to facilitate the air flow and/or the heat flow through the bag carrier and to facilitate wash-out of the soluble detail from the bladder.

* * * * *